(12) United States Patent
Fauci et al.

(10) Patent No.: US 8,788,193 B2
(45) Date of Patent: Jul. 22, 2014

(54) TRACKING ACTIVITY, VELOCITY, AND HEADING USING SENSORS IN MOBILE DEVICES OR OTHER SYSTEMS

(71) Applicant: Gen-9, Inc., Mountain View, CA (US)

(72) Inventors: Mark A. Fauci, Patchogue, NY (US); Yinghao Ma, Potomac, MD (US); Craig Poppe, San Mateo, CA (US); Thung-Han Hee, Stanford, CA (US); Rahul Agrawal, Stanford, CA (US)

(73) Assignee: GEN-9, Inc., Mountain View, CA (US)

( * ) Notice: Subject to any disclaimer, the term of this patent is extended or adjusted under 35 U.S.C. 154(b) by 0 days.

(21) Appl. No.: 13/653,009

(22) Filed: Oct. 16, 2012

(65) Prior Publication Data

US 2013/0096817 A1 Apr. 18, 2013

Related U.S. Application Data

(60) Provisional application No. 61/547,969, filed on Oct. 17, 2011.

(51) Int. Cl.
*G01C 21/34* (2006.01)
(52) U.S. Cl.
USPC .......................................... 701/411; 701/410
(58) Field of Classification Search
USPC ................................................ 701/411, 410
See application file for complete search history.

(56) References Cited

U.S. PATENT DOCUMENTS

| 6,195,475 B1 | 2/2001 | Beausoleil, Jr. et al. |
| 2008/0234935 A1* | 9/2008 | Wolf et al. ..................... 701/216 |
| 2010/0057359 A1* | 3/2010 | Caballero et al. ............. 701/214 |
| 2010/0312519 A1 | 12/2010 | Huang et al. |
| 2011/0238307 A1 | 9/2011 | Psiaki et al. |

FOREIGN PATENT DOCUMENTS

WO 2007/010265 A1 1/2007

OTHER PUBLICATIONS

International Search Report and Written Opinion of PCT/US2012/60509 mailed Jan. 17, 2013, 60 pages.

* cited by examiner

*Primary Examiner* — Mary Cheung
*Assistant Examiner* — Brian P Sweeney
(74) *Attorney, Agent, or Firm* — Kilpatrick Townsend & Stockton LLP

(57) ABSTRACT

Embodiments of the invention provide systems and methods for tracking a mobile device using sensors within the device and without using external signals to determine location, velocity, or heading. According to one embodiment, locating and tracking a mobile device can comprise reading sensor data from each of a plurality of sensors within the mobile device. The sensors can provide the sensor data without relying on a signal from a device external to the mobile device. For example, the plurality of sensors can comprise a compass, a gyroscope, and an accelerometer. Motion, velocity, and heading of the mobile device can be determined based on the sensor data.

24 Claims, 11 Drawing Sheets

TRACKING ACTIVITY, VELOCITY, AND HEADING USING SENSORS IN MOBILE DEVICES OR OTHER SYSTEMS

CROSS-REFERENCES TO RELATED APPLICATIONS

The present application claims benefit under 35 USC 119 (e) of U.S. Provisional Application No. 61/547,969, filed on Oct. 17, 2011 by Fauci et al. and entitled "Tracking Activity, Velocity, and Heading Using Sensors in Mobile Devices or Other Systems," of which the entire disclosure is incorporated herein by reference for all purposes.

BACKGROUND OF THE INVENTION

Embodiments of the present invention relate generally to methods and systems for tracking a mobile device and more particularly to tracking a mobile device using sensors within the device and without using external signals to determine location, velocity, or heading.

There are a variety of techniques used for determining a location of a person or, more specifically, a mobile device being carried by that person. One well-known method involves using a Global Positioning System (GPS) receiver in the mobile device that detects and triangulates globally broadcasts satellite signals. In another method, triangulation of signals from cell sites can be used to determine the location of the mobile device. In yet another method, triangulation of signals from local WiFi equipment can be used to determine the location of the mobile device. In some cases, these different methods can be augmented by using a predefined map of a particular area and the location of the device determined by these methods can be adjusted based on that map. For example, a system employed within a shopping mall for providing location-based advertisements or other functions can use a predefined map of the interior of that mall. Since a shopper cannot be standing where a wall is located and is likely not to be standing or moving through where a fountain or decorations are located, the determined location for that device can be adjusted accordingly to correct for errors.

However, each of these methods have some notable shortcomings. For example, triangulation of cell signals is not very accurate for locating and/or tracking pedestrians. GPS is more accurate but still not very accurate for locating and tracking pedestrians and is commonly unavailable indoors or in other situations. WiFi is highly localized but is available in only limited situations. In short, each of these methods relies on an external signal or devices, i.e., external to the mobile device, and that may be inaccurate, unreliable, or completely unavailable in some situations. Hence, there is a need for improved methods and systems for tracking a mobile device.

BRIEF SUMMARY OF THE INVENTION

Embodiments of the invention provide systems and methods for tracking a mobile device using sensors within the device and without using external signals to determine location, velocity, or heading. According to one embodiment, locating and tracking a mobile device can comprise reading sensor data from each of a plurality of sensors within the mobile device. The sensors can provide the sensor data without relying on a signal from a device external to the mobile device. For example, the plurality of sensors can comprise a compass, a gyroscope, and an accelerometer. Motion, velocity, and heading of the mobile device can be determined based on the sensor data. More specifically, determining motion, velocity, and heading of the mobile device based on the sensor data can comprise classifying activity of the mobile device as motion or static. In response to classifying activity of the mobile device as motion, a velocity for the mobile device can be determined based on the sensor data and a heading for the mobile device can be determined based on the sensor data.

Classifying activity of the mobile device can comprise collecting sensor data from each of the plurality of sensors over a time period. The sensor data can be fused to produce estimates for each of a plurality of indications related to orientation of the mobile device. Each of the estimates can be normalized and a plurality of vectors can be formed representing activity of the mobile device based on the normalized estimates. The activity of the mobile device over the time period can then be classified based on the plurality of vectors.

Determining the velocity for the mobile device can comprise calculating a mean and a standard deviation for each of a plurality of sensor data readings. A feature vector can be generated based on each calculated mean and standard deviation. The generated feature vector can be compared to a reference data set and each feature vector can be assigned to a cluster based on said comparing. The velocity for the mobile device can then be determined based on the clustered feature vector data.

Determining the heading for the mobile device can comprise determining a magnitude of a set of angular velocity data. A determination can be made as to whether the magnitude exceeds a pre-defined threshold. In response to determining the magnitude exceeds the pre-defined threshold, the mobile device can be considered to be rotating. The sensor data can then be corrected for drift over time and the corrected sensor data can be recorded as a heading for the mobile device.

According to one embodiment, a path of the mobile device can be mapped. Mapping the path can comprise identifying each of a plurality of axes of a plane in which the mobile device is moving. A first heading vector along the identified axes and a second heading vector along the identified axes can be determined based on the sensor data. The determined heading vectors can be filtered and a map of the path of the mobile device can be drawn on the plane based on the filtered heading vectors.

For example, filtering the determined heading vectors can comprise storing the first heading vector as a third heading vector when a difference between the first heading vector and the second heading vector is determined to be large. The third heading vector can be copied to a fourth heading vector when a heading of a previous point is consistent with a heading of a current point. The first heading vector can be stored as a fifth heading vector when there is a large, consistent difference between the first heading vector and the fourth heading vector. Heading vectors that indicate quick changes can be discarded and gaps created by said discarding can be filled based on previous heading vectors and next heading vectors of the discarded heading vectors.

Drawing the map of the path of the mobile device can comprise finding a current line of best fit for information received. The current line of best fit can be compared to previously saved lines. In response to determining the current line of best fit is close to parallel to a previously saved line, the current line of best fit can be adjusted to be parallel to the previously saved line. In response to determining the current line of best fit is close in position to a previously saved line, the position of the current line of best fit can be adjusted to match the position of the previously saved line. In response to determining the current line of best fit includes a corner and in response to determining the corner of the current line of best fit matches a corner of a previously saved line, points of the current line of best fit can be adjusted to match points of the previously saved line.

DETAILED DESCRIPTION OF THE INVENTION

Figure 1:
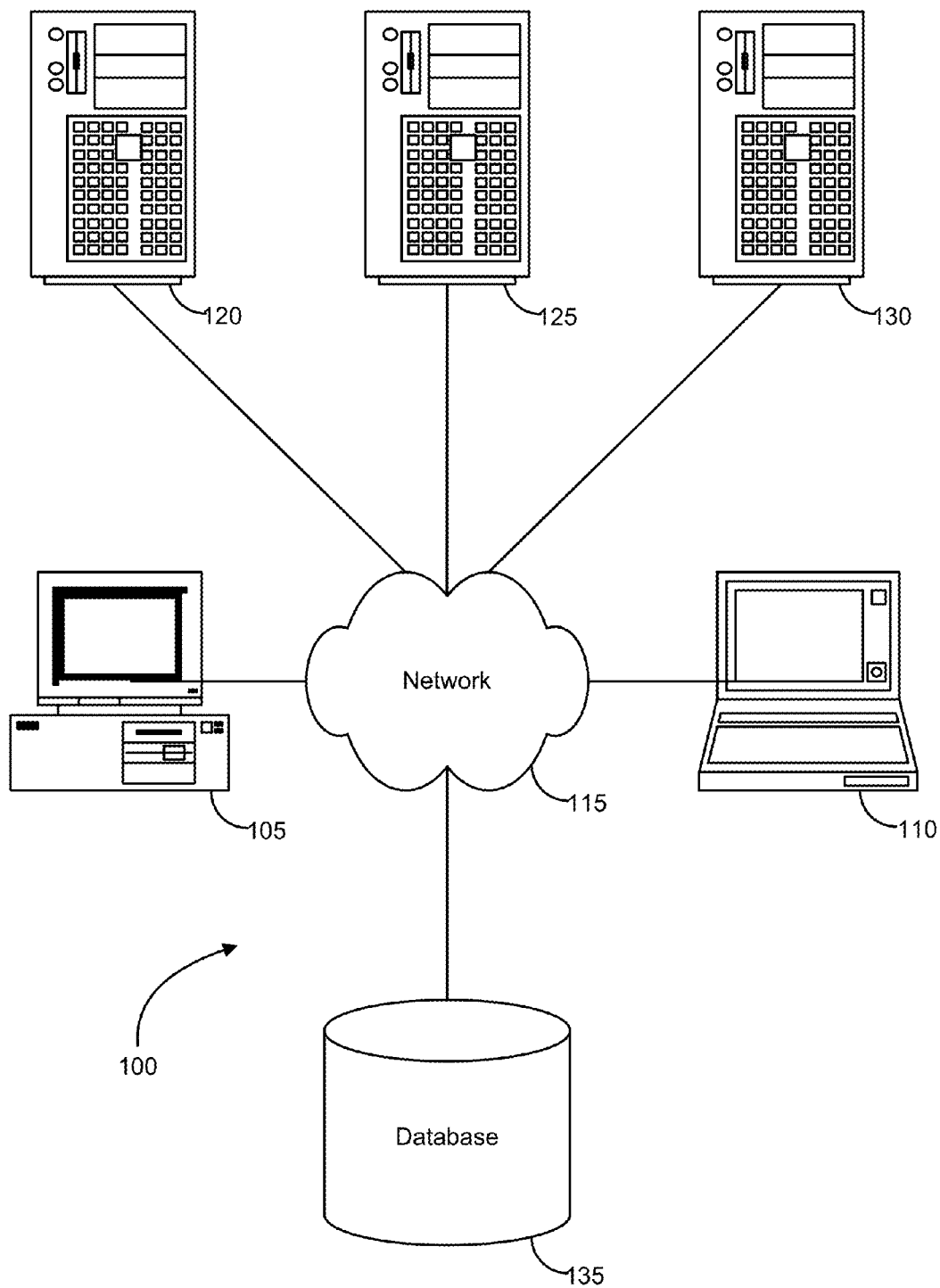
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for tracking a mobile device using sensors within the device and without using external signals to determine location, velocity, or heading. More specifically, embodiments of the present invention provide for obtaining information that can classify activity type, velocity and heading of the mobile device using the sensors that are increasingly integrated with mobile phones, tablet computers and other devices. In some implementations, this information can be used for the remote tracking of the user carrying the device. There are many types of applications where such systems could be deployed. These include, but are not limited to, remotely monitoring elderly at-home-users to measure their activity and insure their health and safety. The same can be applied to patients recently released from the hospital following a surgical or other procedure. Many other implementations and uses of the embodiments described herein are contemplated and considered to be within the scope of the present invention. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The servers) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The servers) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
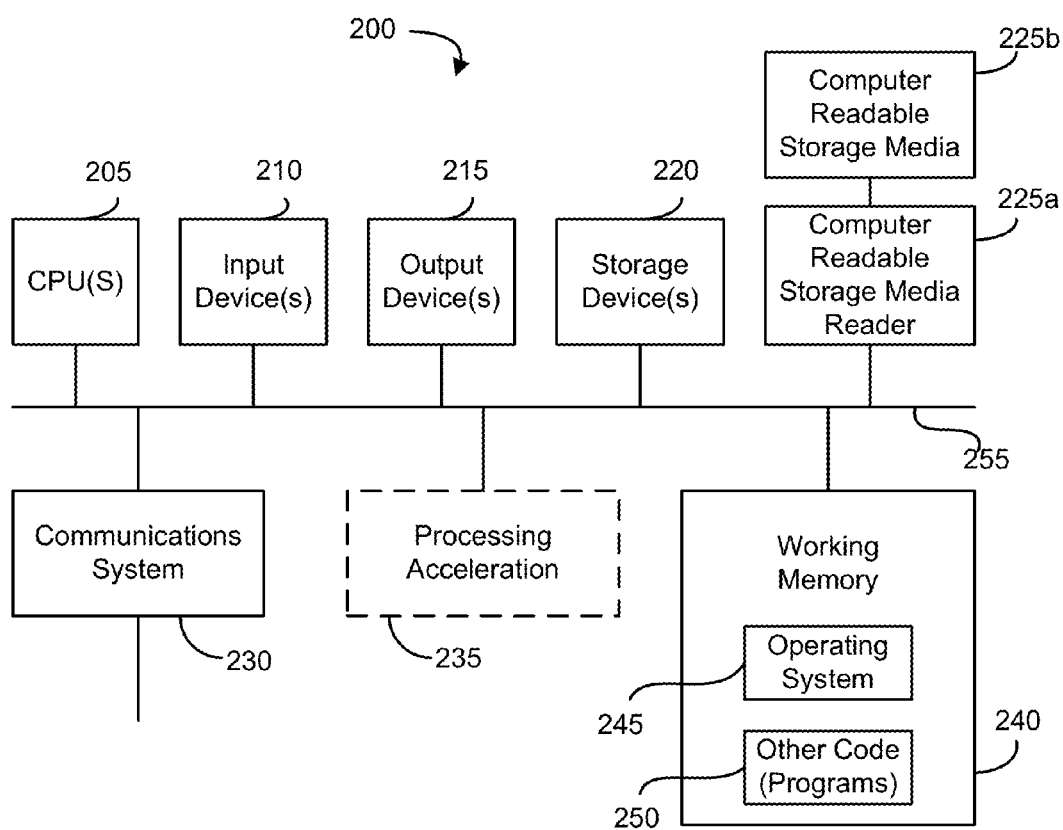
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
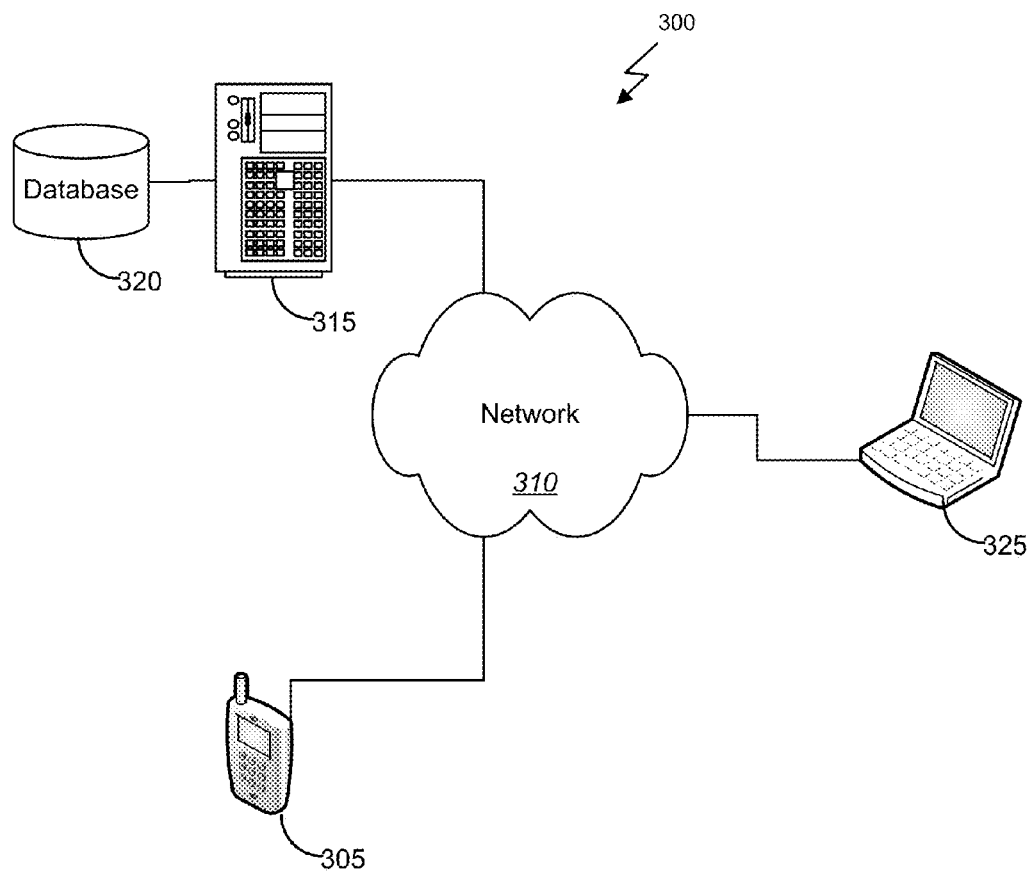
FIG. 3 is a block diagram illustrating, at a high-level, functional components of a system for tracking a mobile device according to one embodiment of the present invention.

FIG. 3 is a block diagram illustrating, at a high-level, functional components of a system for tracking a mobile device according to one embodiment of the present invention. In this example, the system 300 includes a mobile device 305 such as a cell phone, tablet computer, laptop or any other computing device such as described above. In some cases, the mobile device 305 can comprise a device specifically designed for use in the system 300 and which can be conveniently worn or carried by a user. Other than the functions described herein related to tracking the device, such a special-purpose device may or may not include or provide features or functions generally associated with more general purpose mobile devices. For example and in one embodiment, the mobile device 305 can comprise a head-mounted device, with a form-factor similar to a miniature Bluetooth headset. Such a device in such a form-factor can contain sensors such as used by embodiments described herein as well as sufficient memory and CPU power to perform the calculations and other functions described below but onboard this miniature device (as opposed to a smart phone or other mobile device) and then communicate the information to a network either via a mobile phone or without one. However, other form-factors and various other implementations are contemplated and considered to be within the scope of the present invention.

Regardless of the exact type of device, the wireless device 305 can be communicatively coupled with one or more communications networks 310. For example, the network(s) 310 can include a cellular communications network and/or one or more other wired or wireless networks such as the Internet or another network as described above. Also connected with the network(s) 310 can be one or more servers 315 and other computers 325 or devices. The servers 315 can comprise any one or more computers such as described above performing one or more functions and/or providing one or more services related to locating and tracking the mobile device 305 as will be described herein. The servers 315 may maintain one or more databases 320 as noted above which can include information related to the location of the mobile device, subscribers of the services provided, policies such as access control policies, etc. The other computers 325 can comprise any of the variety of computing devices described above and may be used, for example, by an interested third party to locate and/or track, i.e., monitor, the location and movement of the mobile device 305.

Generally speaking and as noted above, embodiments of the invention provide systems and methods for tracking the mobile device 305 using sensors within the device and without using external signals to determine location, velocity, or heading. This information can be used by the servers 315 and/or other computers 325 for the remote tracking of the user carrying the mobile device 305. Such application can include, but are not limited to, services provide by the servers 315 for remotely monitoring elderly at-home-users to measure their activity and insure their health and safety. These services can be provided to interested parties such as caretakers, healthcare professionals, relatives etc. through the other computers systems 325 through a subscription to the service and/or subject to various access controls as can be contemplated.

Figure 4:
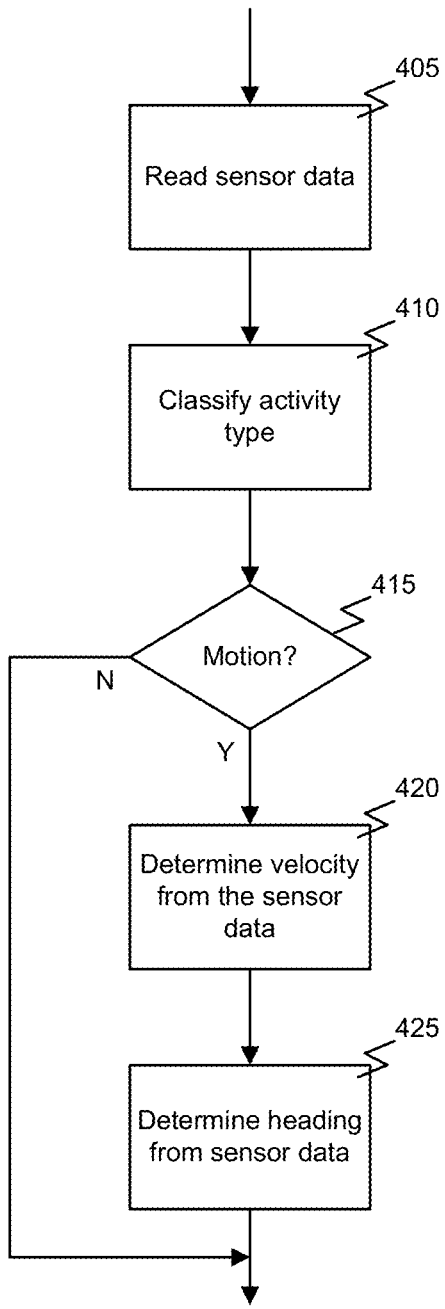
FIG. 4 is a flowchart illustrating a process for tracking a mobile device according to one embodiment of the present invention.

FIG. 4 is a flowchart illustrating a process for tracking a mobile device according to one embodiment of the present invention. In this example, processing begins with reading 405 sensor data from each of a plurality of sensors within the mobile device. The sensors can provide the sensor data without relying on a signal from a device external to the mobile device. For example, the plurality of sensors can comprise a compass, a gyroscope, and an accelerometer. Motion, velocity, and heading of the mobile device can be determined based on the sensor data. More specifically, determining motion, velocity, and heading of the mobile device based on the sensor data can comprise classifying 410 activity of the mobile device as motion or static. In response to classifying 410 activity of the mobile device as motion, a velocity can be determined 420 for the mobile device based on the sensor data and a heading can be determined 425 for the mobile device based on the sensor data.

Classifying Activity Type

This section addresses the issue of algorithmic differentiation of the type of activity that the user of the mobile device is currently engaging in. This capability can be used for a variety of applications from measuring and characterizing calorie consumption to fall detection, or instances in which the user may be incapacitated after a fall, for instance.

Activity types can be classified into two categories, i.e., static and motion, with each of these categories divided into several sub-categories. For example, the algorithm can differentiate between a person sitting still or standing still and differentiate both of those instances from the type of "behavior" measured when the mobile device is left lying on a shelf or desk. The motion category types identified by the algorithm can be differentiated between slow-walking, fast-walking and running.

Embodiments of the present invention can implement a statistical machine learning approach based on data provided by the sensors in the mobile device (i.e. accelerometers, gyroscope, magnetometer, etc.). This data can be modeled to distinguish between these different activity types. To build this model, a set of n features can be analyzed. When plotted the analyzed data can be consistently accumulated (clustered) in different areas of the n-dimensional feature space in accordance with the different activities currently being performed (sitting, standing, walking etc.). An exemplary method to obtain such feature vectors can be summarized as follows:

1. Collects raw sensor data from device Accelerometer, Gyroscope and Magnetometer. These sensors measure the acceleration, the rate of rotation and the ambient magnetic field respectively in the X, Y and Z axis of the device.
2. Take a combination of the raw sensor data and fuse them to produce an estimate of the following data: Roll, Pitch, Yaw, Rotation Matrix (3-by-3 matrix, i.e. 9 values), Quaternions (4 values), Rotation Rate (X, Y and Z axes, i.e. 3 values), Gravity (X, Y and Z axes, i.e. 3 values) and User Acceleration (X, Y and Z axes, i.e. 3 values).
3. In order not to normalize the orientation of the device, the L2-norm of the X, Y and Z values were used. The formulas are given by:

$$\text{NormUserAcceleration} = \sqrt{(\text{UserAccel}X)^2 + (\text{UserAccel}Y)^2 + (\text{UserAccel}Z)^2}$$

$$\text{NormGyroscope} = \sqrt{(\text{Gyro}X)^2 + (\text{Gyro}Y)^2 + (\text{Gyro}Z)^2}$$

4. Data over a period of time (t=1, 2, . . . , T) can be collected and formed into two vectors, hereafter referred to as NormUserAccel and NormGyro. The feature vector used in the model can be calculated as:

$$\text{Feature Vector} = \begin{pmatrix} \frac{1}{T}\sum_{i=1}^{T}(NormUserAccel_i) \\ \alpha(NormUserAccel) \\ \frac{1}{T}\sum_{i=1}^{T}(NormGyro_i) \end{pmatrix}$$

The first and third terms of the feature vector are simply the means of the NormUserAccel and NormGyro vectors respectively. The second term is the standard deviation of the NormUserAccel vector.

Figure 5:
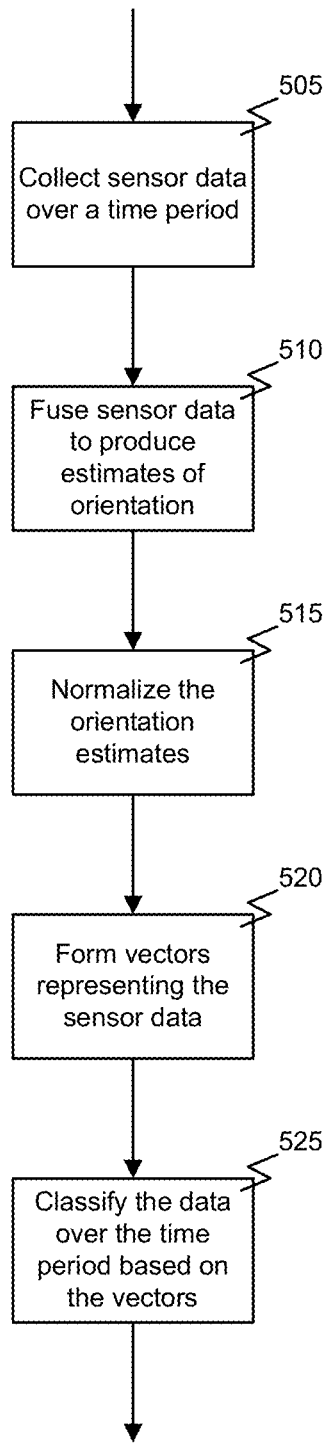
FIG. 5 is a flowchart illustrating a process for classifying sensor data according to one embodiment of the present invention.

FIG. 5 is a flowchart illustrating a process for classifying sensor data according to one embodiment of the present invention. As illustrated here, classifying activity of the mobile device can comprise collecting 505 sensor data from each of the plurality of sensors over a time period. The sensor data can be fused 510 to produce estimates for each of a plurality of indications related to orientation of the mobile device. Each of the estimates can be normalized 515 and a plurality of vectors can be formed 520 representing activity of the mobile device based on the normalized estimates. The activity of the mobile device over the time period can then be classified 525 based on the plurality of vectors.

For example, a classification method can plot the data points on a 2-dimensional or 3-dimensional graphical representation. A variety of classification techniques can be used to do so. An exemplary algorithm is the k-Nearest Neighbors algorithm. This algorithm finds the k-nearest points to the new, unclassified point, where the measure of distance used is the Euclidean distance. Then the majority rule is applied, i.e. if that new, unclassified point is closer to more points in Group A than in Group B, then it will be classified as part of Group A. These groups can include any of the categories (i.e., motion or static) or subcategories mentioned above.

Determining Velocity

If the current activity level of the user of the mobile device is determined to be in motion, i.e., not static, embodiments of the present invention can proceed to determine the speed of the user. Embodiments described here can be used to differentiate the speed of the user while walking, as well as identify and differentiate between pedestrian and wheeled transportation methods (wheelchairs, bicycles etc.). As with the embodiments described related to motion state (static verses motion), these embodiments focus on determining velocity, when motion occurs, by analyzing specific data patterns provided by the sensors (accelerometer, gyroscope, magnetometer) to characterize patterns generated at different velocities. The machine learning algorithms can express these values, from repeated test trials, as data clusters, which make it possible to predict the velocity for each new data value.

Figure 6:
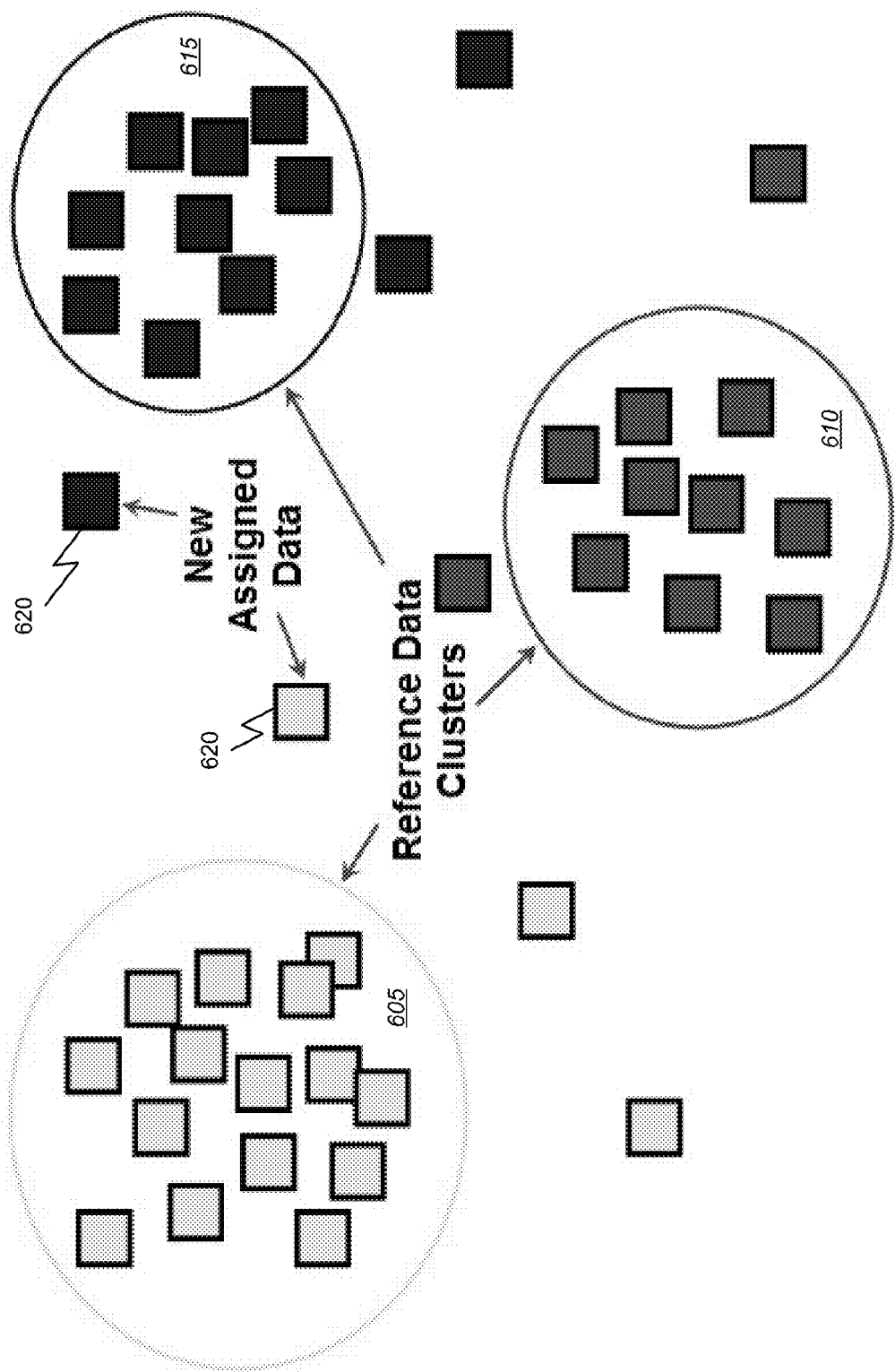
FIG. 6 is a block diagram conceptually illustrating clustering of sensor data according to one embodiment of the present invention.

FIG. 6 illustrates the result of the machine learning algorithm that was used to characterize each of the data sets. For example, for a particular velocity, the mean and standard deviation of the readings from each of the accelerometers and gyroscopes can be used to characterize that velocity. These numbers can be collected in a feature vector. Each velocity can then be characterized by its unique feature vector cluster. This constitutes the reference data cluster 605, 610, or 615. When some new data 620 and 625 is collected, its characteristic feature vector can be calculated and then compared with the reference data set to determine velocity by assigning it to one of the reference data clusters 605, 610, 615.

Figure 7:
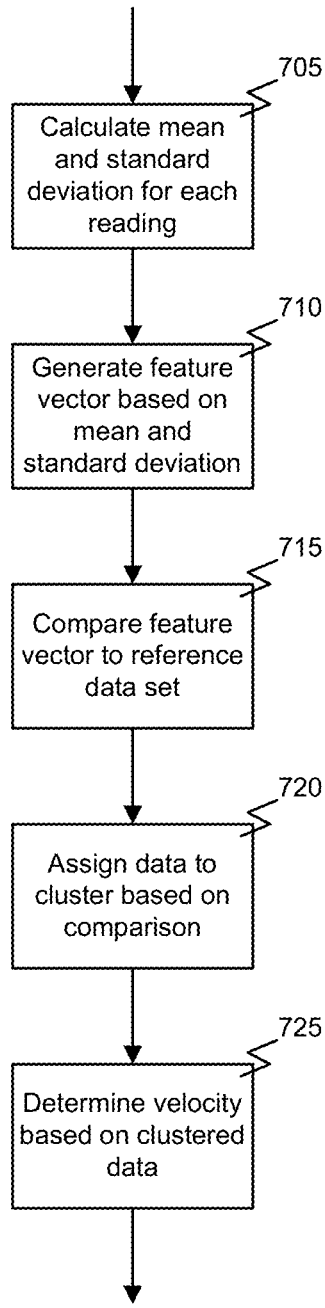
FIG. 7 is a flowchart illustrating a process for determining velocity according to one embodiment of the present invention.

FIG. 7 is a flowchart illustrating a process for determining velocity according to one embodiment of the present invention. As illustrated in this example, determining the velocity for the mobile device can comprise calculating 705 a mean and a standard deviation for each of a plurality of sensor data readings. A feature vector can be generated 710 based on each calculated mean and standard deviation. The generated feature vector can be compared 715 to a reference data set and each feature vector can be assigned 720 to a cluster based on said comparing. The velocity for the mobile device can then be determined 725 based on the clustered feature vector data. The process of assigning new values to one of the reference clusters can be accomplished using a variety of methods. Some, but not all, are described below.

Minimum Squared Error—In this method, a test feature vector can be subtracted from each of the training vectors. The resulting vector can be squared and the sum of the elements can be calculated. The result with the minimum value can be chosen as the predicted velocity for that data set. The following methods are separate from the method mentioned above in that for the above method, each velocity can be classified by a unique feature vector. In the methods described below, each velocity can be classified by a cloud of points rather than a single one in feature space. The cloud for each velocity can be separated from the others in the high dimensional feature space and so when a new feature point is presented, its position with respect to a cloud, rather than a single point decides which velocity class it belongs to. In high dimensional feature space, clouds belonging to different velocities would be separable such that new data could be classified according to which cloud it is nearest to.

K-nearest neighbors—Given a training set cloud similar to described above, if a new test feature vector needs to be classified, its 'k' (where 'k' is some integer) nearest neighbors in the feature space are found. Depending on which class the majority of the 'k' neighbors belong to, the test feature vector can be classified accordingly.

Naïve Bayes Classification—Naïve Bayes classifiers are statistical techniques built on Bayes' Theorem from probability. They assume that the presence (or absence) of a particular feature of a class is unrelated to the presence (or absence) of any other feature, given the class variable.

Linear and Quadratic classifiers from MATLAB's Statistics Toolbox—These are conceptually similar techniques to those mentioned above with the point clouds in high dimensional feature space. They differ in the way the boundary between two clouds is decided. In the former the boundary is linear and in the latter the boundary is quadratic.

Embodiments of the present invention can also account for the continuous velocity variations associated with pedestrian locomotion. For example, a regression algorithm model can be implemented in order to enable the prediction of these continuous rather than discrete velocities. In such models, sets of features can be used to characterize the pattern of motion at a particular velocity. These features can include:
1. The standard deviation of the X, Y and Z User Acceleration.
2. The standard deviation of the X, Y and Z Gyroscope.
3. The principle frequency of the X, Y and Z Magnetometer using Fourier transforms.
4. The principle frequency of the X, Y and Z Gravity readings using Fourier transforms.
5. The principle frequency of the X, Y and Z Magnetometer using a different method for calculations (described below).
6. The principle frequency of the X, Y and Z Gravity using the same method for calculations as (5).

Different permutations of these quantities can be used to constitute a training feature vector. For a new test data set, at each instant, the feature vector can be calculated (using the features corresponding to those used in the training set) and can be put into the different machine learning models to return the predicted velocity from each method.

As described above, the features can be used in calculating the velocity value. Furthermore, the calculations were run with different combinations of these features to further refine the algorithm. In each case however, the model can include the data from all three axes in each of the feature groups mentioned above. This helps prevent the models from being biased towards a particular orientation of the devices. The following describes some possible the machine learning methods that can be used in developing these models.

Classification Models

Least Mean Squared Error Method.

The training data for each velocity can be averaged to find the mean training velocity vector that characterized that particular velocity. In some sense, in high dimensional feature space, this would represent the cluster center of the particular velocity cluster. For a test feature vector, its Euclidean distance to each of the training cluster centers can be calculated. The cluster center that it is closest to can be predicted to be the velocity for that particular test feature vector.

K-Nearest Neighbor Prediction.

The training data can be distributed in high dimensional feature space as in the previous case. For a test feature vector, its nearest neighbors can be found and the velocity of the majority of those neighbors can be used as the predicted velocity of the particular test feature vector.

Linear Classification.

This is an algorithm from the MATLAB library functions. It draws a linear discriminant boundary between the different training velocity clusters and predicts the velocity of a new test feature vector depending on which region it lies in, in the high dimensional feature space.

2. Regression Models

Un-Weighted Linear Regression.

This is a method in machine learning to essentially draw a line through the different clusters of the training data. Under certain statistical assumptions about the data, un-weighted linear regression results in the best fit line to the data (in higher dimensions it would not be a line but a hyper-plane). The training data represents motion at various velocities. Thus with the hyper-plane produced by linear regression it would be feasible to predict intermediate velocities with reasonable accuracy.

Weighted Linear Regression.

This method theoretically accounts for variance that in some cases, severely affects the performance of linear regression. For instance, training clusters at different velocities might not be linearly related. So the best fit straight line for such data would not adequately capture the relationship in the data. Thus in weighted linear regression, when making predictions for a given test feature vector, the process is different. This method places more weight on those training samples that are closer (in some Euclidean sense) to the test feature vector and uses them as more important predictors than those samples that are farther away. The weights in this case were decided based on an exponential function given by:

$$\text{Weight on training sample } x = \exp\left(-\frac{\|\text{test feature vector} - \text{training sample vector } x\|^2}{2\sigma^2}\right)$$

This is very similar to a Gaussian distribution in appearance but is not the same. The value sigma is a drop-off parameter that controls how quickly the weights drop away with increase in the value of the term. For this set of experiments it was found that sigma=0.1 gave reasonable results.

Unlike previous methods where distance estimation generally grew exponentially larger (and less accurate) compared to the actual values, the methods described here provided significantly more precise estimations of velocity over a range of velocities. Furthermore, the overall accuracy of the results, will improve as the database of training data is increased to take into consideration variations between individual body types and device placement on the subject's person.

Determining Heading

There is a small amount of noise present in the gyroscopic data at all times, including when the device is not rotating, so pure integration would result in unacceptable drift. To combat this, the heading algorithm can consider the device to be rotating when the magnitude of the angular velocity is above a certain threshold. The magnitude of the noise varies among the devices, so this threshold can be hard coded into the program based on examining a sample of the noise from each device or device type. Of course, this noise is still present when the device is rotating, so the heading will still drift over time. After the initial estimate of heading is calculated various methods as will be described below can be used to help correct this drift.

Figure 8:
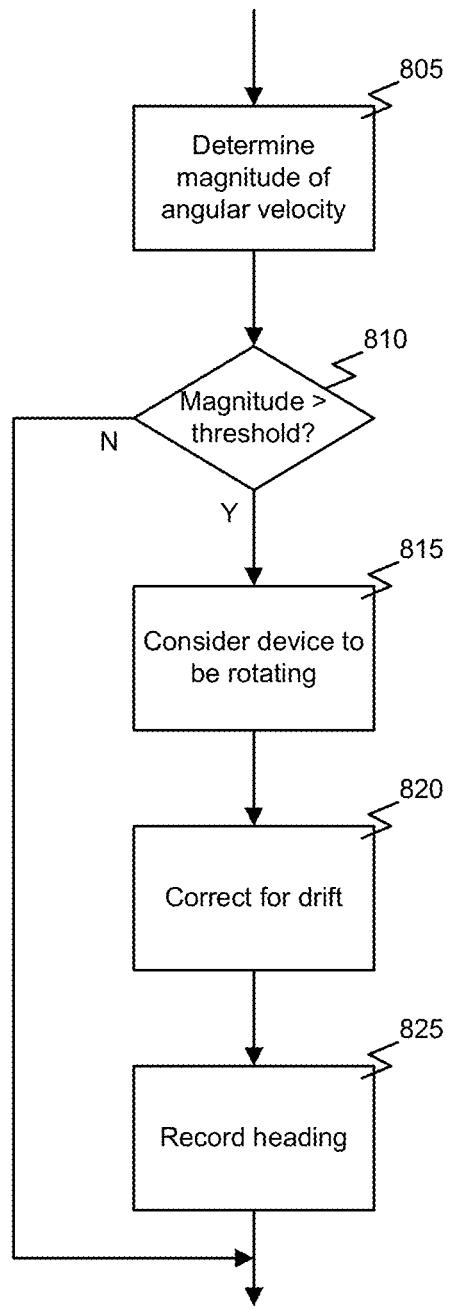
FIG. 8 is a flowchart illustrating a process for determining a heading according to one embodiment of the present invention.

FIG. 8 is a flowchart illustrating a process for determining a heading according to one embodiment of the present invention. As illustrated in the example, determining the heading for the mobile device can comprise determining 805 a magnitude of a set of angular velocity data. A determination 810 can be made as to whether the magnitude exceeds a pre-defined threshold. In response to determining 810 the magnitude exceeds the pre-defined threshold, the mobile device can be considered 815 to be rotating. The sensor data can then be corrected 820 for drift over time and the corrected sensor data can be recorded 825 as a heading for the mobile device. The following methods can be used, after the initial estimate of heading is calculated, to help correct this drift.

Sensor Fusion with Magnetometer

Theoretically, the heading can also be calculated by using the magnetometers of the mobile device to measure the Earth's magnetic field, which can then be used to find the device's absolute orientation. The problem with this approach is that the magnetometers pick up all magnetic fields, not just the Earth's, so there is a lot of noise in the readings due to magnetic fields generated by metals and electronic devices. This noise also varies greatly as the device changes its distance from these magnetic fields, so it is extremely difficult to filter out this noise, especially without some a priori knowledge of the magnetic fields present in the environment.

However, the magnetometer does provide a signal that goes through a series of maximums and minimums as the device rotates. Since the largest component of the magnetic field present in most everyday environments is still the Earth's magnetic field, which is not changing, these extremes in the signal usually occur at the same orientation, i.e., if the magnetometer reading reaches a maximum at a heading of 135°, that reading will also be at a maximum the next time the device is at a heading of 135°. If an estimate of the heading has already been established, embodiments of the present invention can use the magnetometer reading to correct for drift by looking for extremes in the magnetometer readings. When a maximum is found, embodiments of the present invention can set the current heading equal to the heading of the device at the last maximum.

This method is not foolproof, though, as noise will invariably create a series of local extrema that do not occur predictably. At least some of this noise can be removed by applying a low-pass filter and calculating a moving average. To handle the remaining noise, embodiments of the present invention can check two conditions when an extreme is detected and before adjusting the heading.

One check can be expressed as: Is the initial estimate of the heading at the latest extreme within a certain tolerance of the heading found at the last similar extreme ("similar" extreme meaning that if at a maximum, look for the last maximum)? If the current heading differs from the last heading by a very large amount, greater than 30 degrees or so, it is likely that this difference is not due to drift. It is more likely that at least one of the two maximums in the magnetometer reading is a local maximum due to noise.

Another check can be expressed as: Is the estimate of the heading fairly stable at both extremes? Because of the filtering techniques applied to the magnetometer signal, the signal usually lags behind the heading estimate so that by the time the extreme in the magnetometer signal is reached, the heading has already been constant for a second or two. If the heading were to start changing again a moment before the magnetometer signal reached its extreme, the heading at the current extreme might still be within the tolerance of the heading at the previous extreme, but there will now be an error in the adjustment because the current extreme doesn't really correspond to the current heading; it corresponds to the heading 0.5 seconds ago. For example, let's say that the calculated heading is 75° at the first maximum and 80° at the second. Since 80 is approximately equal to 75, assume both maximums are legitimate (i.e., not a result of noise) and that the difference in five degrees is due to drift, so change the current heading from 80° to 75°. But what if the device rotated 10 degrees right before the second maximum so that at that maximum, the heading estimate is actually 70°? This is still within the tolerance, so assume the difference is due to drift and not noise, but if the 70° estimate is replaced with 75°, this would be compounding the drift because the correction is being made in the wrong direction. The estimate really drifted +5 degrees, but because of the lag in the magnetometer signal, a correction for a drift of −5 degrees was made. So, the actual current heading is 65° but a heading of 75° is recorded, doubling the drift in the estimate. To guard against this error, embodiments of the present invention can check that the heading at each maximum has not significantly changed in the past x samples.

Environment Mapping

This method takes advantage of the fact that people's movement is often restricted to fairly well-defined paths. For example, a person in an office building is bound to walk patterns constrained by the walls, hallways and other obstacles. As the algorithm tracks the subject's position and displacement, it can check the current estimate of position against the previously calculated positions. If the subject travels down a path that is similar in orientation and position to a path the subject has already taken, embodiments of the present invention can infer that this is a well-defined path the subject often takes, either due to physical restrictions, such as a hallway, or to habit or convention. Therefore, when estimating the subject's movement to be similar to a previously established pattern, embodiments of the present invention may assume the subject is actually repeating that same pattern and that any small differences in heading or position are errors. This provides another way to help combat drift in the calculations. If the algorithm initially estimates the user to be walking along an established path but estimates a heading that is 20° different from the orientation of the path (as estimated when the user first established that path), it is probable that some drift in the heading estimate has occurred, and embodiments of the present invention can account for it.

Embodiments of the present invention can also make adjustments to our location calculations based on assumptions about the way paths tend to be organized. For example, the hallways in an office building are likely to be either parallel or perpendicular to each other. It is especially unlikely for two hallways to be at a small angle to each other, like ten degrees. This means embodiments of the present invention can compare the heading of the user's current path to all the previous paths the user has taken. If the current path is close to parallel to a previous path, embodiments of the present invention can infer that the two paths are most likely supposed to be parallel and that the small difference in heading is due to drift, which embodiments of the present invention can correct.

Comparison of Methods

The biggest strength of the magnetometer method is that the assumptions that are made are more often valid than those in the environmental mapping method. The only assumption made is that the magnetic field in the environmental is fairly constant, with variations that are an order of magnitude smaller than the average strength of the field. Since the dominant magnetic field source in most everyday environments is the field of the Earth, which embodiments of the present invention an treat as constant (it is changing, but not quickly enough to be relevant to this application), this assumption is usually valid. The average person is still likely to occasionally experience large fluctuations in the magnetic field they are in, such as when they walk by a television that is turned on, but the safeguards described above seem to reliably ignore these events, as the raw data from the magnetometers were very noisy, but the algorithm did not misinterpret any of this noise.

The drawback to this approach is that since it looks for extrema in the magnetometer data, the subject should rotate 180 degrees before the algorithm can correct for any drift. The algorithm described above compares maximums to other maximums and minimums to other minimums, but it would be possible to correct the heading at a minimum with the heading at a maximum since those headings should be 180 degrees from each other.

In contrast, the quality of the corrections applied with the environmental mapping approach relies much more heavily on the validity of the assumptions made about the way the subject is moving. This can be an advantage because this approach is not as susceptible to noisy data but the algorithm factors in a larger number of environment variables to be consistent, which causes it to be more complex than the magnetometer algorithm.

Refinements for Determining Pedestrian Heading

This section describes improvements to the heading algorithm so that it can estimate the path taken of a user carrying a device in his pocket (phone) or in a computer bag on his shoulder (tablet). With the device in the user's pocket, embodiments of the present invention can obtain an estimate of the heading if two conditions are met:

1. At some point in each step taken, the device is oriented such that one of its axes is closely aligned with Earth's gravity.
2. Each time the device is aligned this way, it is in the same orientation relative to the path being taken.

When the device is aligned vertically, embodiments of the present invention know that the two axes not aligned with gravity are in a horizontal plane, and embodiments of the present invention can use the magnetic readings on those axes to calculate a heading. Even if this heading is not the same as the actual heading of the user, it can still be used to draw the shape of the path taken if the difference between the user's heading and device's heading is constant.

The following presents an outline of the steps in the algorithm:

1. Identify the two axes that will align with the horizontal plane as the user walks, and use the magnetometer readings on those axes to obtain a heading estimate. The vector created in this step will be referred to as raw_heading.
2. For each data point, if the magnitude of the gravity vector measured on the third axis is close to 1 g, save the raw heading at that point in a new heading vector. Otherwise, save the last entry in the new heading vector as the heading for this point. The vector created in this step will be referred to as first_heading.
3. Calculate a moving median of the new vector to filter out noise. The vector created in this step will be referred to as second_heading.
4. Further filter the heading vector using the following methods:
    (a) Restore the first_heading estimate at points where there is a large difference between the first_heading and second_heading (this is the third_heading).
    (b) For each point, compare the raw heading signal at that point to the raw heading in the preceding points. If a previous point is found that is similar to the current point, copy the third_heading estimate at the previous point and save it as the heading estimate at the current point (this is the fourth_heading).
    (c) Restore the first_heading estimate at points where there is a large, consistent difference between the fourth_heading and first_heading estimates (this is the fifth_heading).
    (d) Throw out heading estimates in areas where the heading changes quickly. Fill in the first half of the gap with the estimate before the gap and the second half with the heading after the gap (this is the final_heading).
5. Begin drawing a map of the path taken by using final_heading and assuming the user moves at a constant velocity.
    (a) Find the (straight) line of best fit for the coordinates calculated so far.
    (b) If the path calculated begins to change such that a single straight line cannot adequately represent it, save the line that best represents the data collected so far and begin a new line of best fit to represent the position points calculated since the end of the previous line.
    (c) When a line of best fit is ended and saved, compare it to the lines of best fit already saved, checking for lines that are parallel or the same.
    (d) If a previous line is found that is close to parallel to the first line, assume the two paths are in fact parallel and that the difference in calculations is due to error. Adjust the position points associated with the current line of best fit so that are parallel to the previous line.
    (e) If a previous line is found to be close to parallel and also close in position to the current line, assume these two lines are actually the same path. Adjust the position points associated with the current line of best fit so that they are on the same path as the previous line.
    (f) Check to see if the point that begins the most recent line of best fit is a corner, and if so, if it matches any previous corners. If it does, move the points of the more recent corner to overlap the previous corner found.

The raw heading can be calculated using the following logic:
if the magnetometer reading on axis 1 (m1) is above zero $$\text{raw heading} = -90 - \operatorname{atan}(m2/m1)$$

else $$\text{raw heading} = 90 - \operatorname{atan}(m2/m1)$$

As described here, the two axes that aligned with the horizontal plane were identified by visually inspecting the gravity data collected on all three axes. The two that do not come near 1 g are identified as the ones that cross the horizontal plane. This identification can be coded by taking the absolute value of the average of the gravity measured in the three axes and choosing the two axes with the smaller values.

Figure 9:
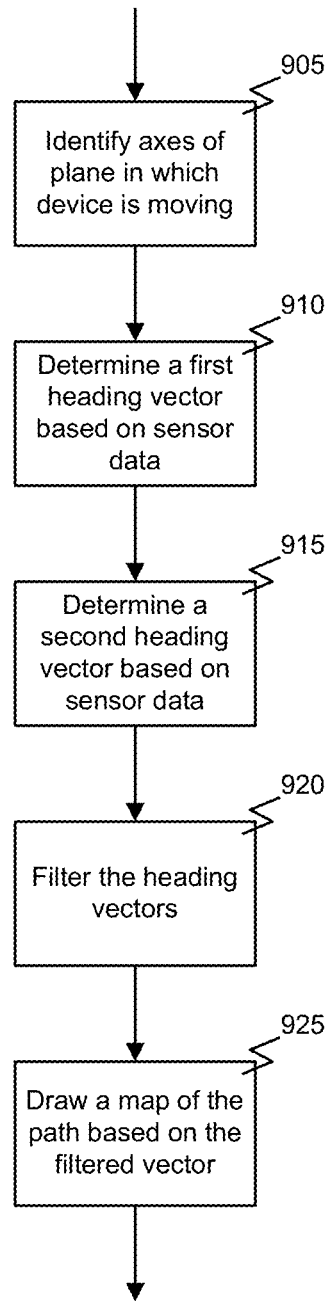
FIG. 9 is a flowchart illustrating a process for mapping location information according to one embodiment of the present invention.

FIG. 9 is a flowchart illustrating a process for mapping location information according to one embodiment of the present invention. As illustrated in this example, mapping the path of a mobile device can comprise identifying 905 each of a plurality of axes of a plane in which the mobile device is moving. A first heading vector along the identified axes and a second heading vector along the identified axes can be determined 910 and 915 based on the sensor data. The determined 910 and 915 heading vectors can be filtered 920 and a map of the path of the mobile device can be drawn 925 on the plane based on the filtered heading vectors.

Figure 10:
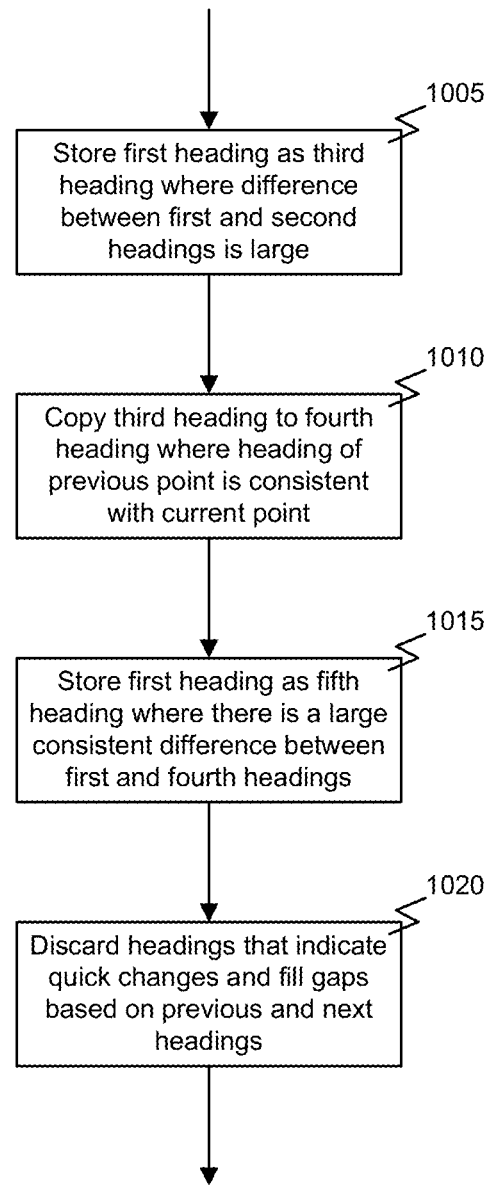
FIG. 10 is a flowchart illustrating an exemplary process for filtering heading information according to one embodiment of the present invention.

FIG. 10 is a flowchart illustrating an exemplary process for filtering heading information according to one embodiment of the present invention. As illustrated here, filtering the determined heading vectors can comprise storing 1005 the first heading vector as a third heading vector when a difference between the first heading vector and the second heading vector is determined to be large. The third heading vector can be copied 1010 to a fourth heading vector when a heading of a previous point is consistent with a heading of a current point. The first heading vector can be stored 1015 as a fifth heading vector when there is a large, consistent difference between the first heading vector and the fourth heading vector. Heading vectors that indicate quick changes can be discarded 1020 and gaps created by said discarding can be filled based on previous heading vectors and next heading vectors of the discarded heading vectors.

Figure 11:
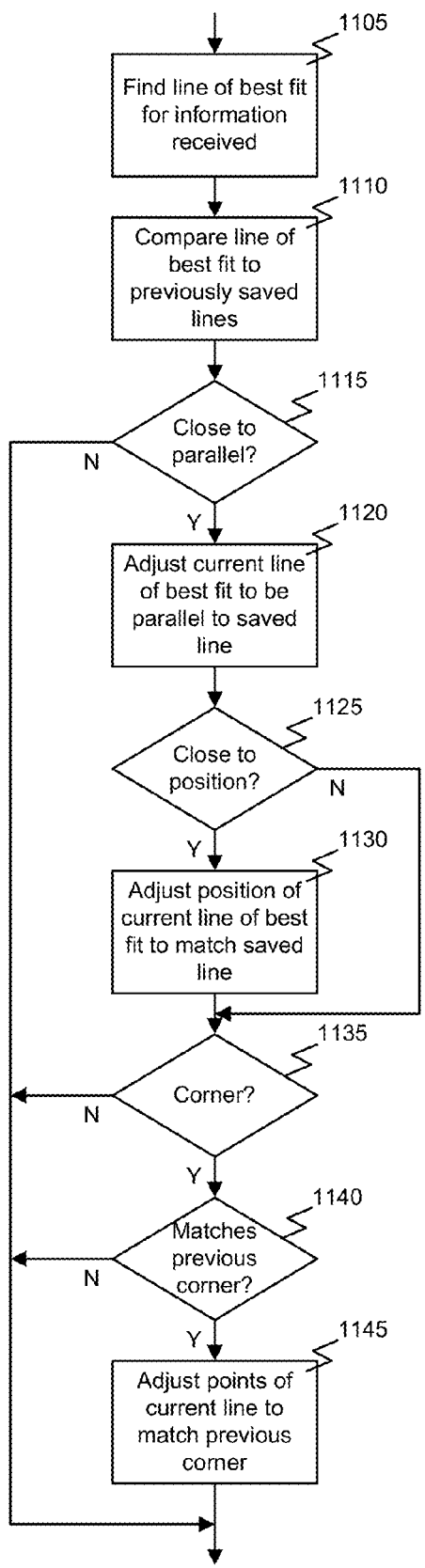
FIG. 11 is a flowchart illustrating an exemplary process for drawing a map of location information according to one embodiment of the present invention.

FIG. 11 is a flowchart illustrating an exemplary process for drawing a map of location information according to one embodiment of the present invention. As illustrated in this example, drawing the map of the path of the mobile device can comprise finding 1105 a current line of best fit for information received. The current line of best fit can be compared 1110 to previously saved lines. In response to determining 1115 the current line of best fit is close to parallel to a previously saved line, the current line of best fit can be adjusted 1120 to be parallel to the previously saved line. In response to determining 1125 the current line of best fit is close in position to a previously saved line, the position of the current line of best fit can be adjusted 1130 to match the position of the previously saved line. In response to determining 1135 the current line of best fit includes a corner and in response to determining 1140 the corner of the current line of best fit matches a corner of a previously saved line, points of the current line of best fit can be adjusted 1145 to match points of the previously saved line.

Obtaining First Heading—

In addition to checking if the gravity measured on the third axis is close to 1 g, the algorithm can check several more conditions that help indicate how accurate the heading estimate is at that point. For example, it can check if the gravity signal on that axis is at a maximum. If it is, the device is as close to vertical as it will get for that particular step, which means that will probably provide the best heading estimate. If the gravity signal is not at a maximum, the heading estimate at that point can be ignored. The algorithm can also check the slope of the magnetic field strength signal. Theoretically, if the only magnetic field present were that of the Earth, the field strength should not change enough to be picked up by the magnetometers as the user walks around. Due to a variety of sources of small magnetic noise and imperfections in the magnetometers, the measured strength will almost always vary a small but significant amount, but if the strength quickly changes by a large amount, it is most likely due to a large noise source that will render the heading estimate unreliable. If the slope of the field strength is above a certain threshold, the heading at that point can be ignored. The strength of the field measured in the horizontal plane can also be checked because if the measurement on one of the axes is fluctuating between a positive and negative number, this can result in an unreliable heading measurement. To illustrate this, let's say that the magnetometers on the horizontal axes are measuring magnetic field strengths of 1 uT and 1 uT, but one of the 1 uT readings sometimes bounces to −1 uT. In the first scenario, the measured heading would be calculated as −90−atan(1), which is −135 degrees, but in the second scenario, the heading would be 90−atan(−1), which is 135 degrees. If the magnetic field strength in the horizontal plane is below a certain, threshold, then, embodiments of the present invention can ignore the heading calculation at that point.

Obtaining Second Heading—

A moving median is the median of the collection of data points that surround the data point of interest. For example, considering the vector [7 3 11 −2 5 6] and taking the moving median of three data points at a time, the resulting vector would be [7 7 3 5 5 5]. For each data point, take the median of the sampling that consists of the point in question as well as the point before and after it, so for the third entry, 11, the median for that point is the median of the sample [3 11 −2]. For data points at the beginning and end of the first vector, where there are not enough surrounding data points to get a big enough sample size, the median of the closest data point with a big enough sample is substituted. For the first entry in the vector, 7, there is no data point before it, so the median of the next entry, 3, is used as the median for the first entry.

Obtaining Third Heading—

Since the algorithm ignores the heading calculation when there is a large spike in the strength of the magnetic field, there shouldn't be any spikes of noise left that are extremely large. Therefore, if there is an unusually large difference, around 90 degrees, between the first_heading and second_heading at any point, it is likely that the change is due to a real change in heading, so embodiments of the present invention can undo the filtering that occurred by taking the median at that point and restore the heading estimate present in first_heading.

Obtaining Fourth Heading—

This step is a form of redundancy, in case the filtering so far did not yield very good results for some parts of the signal. The easiest way to mathematically identify that two sections of the raw heading signal represent the same heading is to compare the values of the moving average at each section. Embodiments of the present invention compare the moving average of the raw heading at the current point to the moving average at previous points up until fifty samples before the current index. If a section is found with a moving average close to the current moving average and the average at both sections is fairly stable (determined by comparing the slope of the moving average to a threshold), then embodiments of the present invention can assume that the user was on the same heading at both sections, so embodiments of the present invention can take the heading determined at that previous section and record it as the heading at the current index. It is important to make sure that the average is not changing too much at either point because the heading estimations are not very reliable when the signal is changing.

Obtaining Fifth Heading—

This step is another attempt to undo the median filtering in cases where the changes that were filtered out were likely not noise. When the user makes a left turn soon after (two seconds or so) a right turn, or vice versa, the raw heading will show a hump that gets removed by taking a moving median. Usually, when the filtered heading and raw heading are superimposed, one sees that the raw heading signal constantly crosses the filtered heading signal, usually with every footstep. In this case, though, the hump stays on one side of the filtered heading for an unusually long time, on the order of two seconds. This blocks checks for such humps by keeping track of the area between the filtered and raw headings. If there is a section where the raw heading and filtered heading differ by a considerable amount for a long period of time, this section is probably indicative of a quick left-right or right-left, and the first heading estimate is restored.

Obtaining Final Heading—

When the device's orientation is changing, the magnetometer readings tend to not be reliable enough to get a good heading estimate. Embodiments of the present invention solve this problem by ignoring the heading calculations when the signal is changing very quickly and fill in the gaps by assigning the heading before the gap to the first half of the gap and the heading afterwards to the second half of the gap. Embodiments of the present invention determine whether the signal is changing too quickly by taking a moving average and comparing its slope at each point to a threshold value. For example, if the heading is 0 degrees at point 99 and 90 degrees and point 151 and the standard deviation for points 100 to 150 is above the threshold, points 100 to 125 will be given a heading of 0 and points 126 to 150 will be given a heading of 90.

Finding Line of Best Fit—

As each new point is added to the map, the line of best fit for the current path is found. To find this line, two matrices are constructed. One is just a vertical vector containing the y-values of the coordinates. The second is matrix with two columns, where the first column contains ones and the second column contains the x-values of the coordinates. MATLAB has overloaded the backslash operator so that performing X\Y will return the matrix A, a 2×1 matrix where the first entry is the y-intercept and the second entry is the slope of the line of best fit. The correlation coefficient, $r^2$, is then calculated using the following equation:

$$r^2 = \frac{ss_{xy}^2}{ss_{xx} ss_{yy}} \text{ where}$$

$$ss_{xx} = \Sigma(x_i - x_{avg})^2$$

$$ss_{yy} = \Sigma(y_i - y_{avg})^2$$

$$ss_{xy} = \Sigma(x_i - x_{avg})(y_i - y_{avg})$$

Start New Line of Best Fit—

The program has to be able to recognize when to end one line of best fit and start a new one to represent the path. There are two different ways the program determines that it is time to start a new line:
1. If the correlation coefficient ($r^2$) falls below a certain threshold.
2. The correlation coefficient drops a certain number of times in a row, regardless of how good the correlation is. A consistent drop in $r^2$ usually indicates that the user is rounding a corner.

In either case, the number of sample being used to calculate the line of best fit must meet a certain minimum before the algorithm decides to start a new line. The reason for this rule is that when trying to fit a line to a small number of data points, a bad fit often gets better as more data points are added, so if the number of points being fitted is less than min_samples, embodiments of the present invention can continue to add more data points to this fit even if the $r^2$ value is low.

Look for Parallel Lines—

Once one line of best fit has been ended and saved, it is compared to the lines of fit already collected that describe the path taken so far to see if it is parallel to any of them. Since indoor environments are often laid out so that people move in paths that are either parallel or perpendicular to each other, the algorithm assumes that if the headings of two lines are within a certain tolerance of each other, the paths they represent are probably parallel. For the current line to be considered parallel to a previous line, the previous line must represent a minimum number of samples. The reason for this is that occasionally, a very short line of best fit is produced when the user is making a drastic change in direction. This short line does not represent any real distance traveled, though, so its heading probably does not reflect the characteristics of the paths available in the room. If, for example, a user were to walk in a square, the paths taken would have headings of 0, 90, 180 and −90 degrees. It's possible that, while trying to map out a corner, the algorithm connects a 0 degree path and 90 degree path with a very short 60 degree line. Later on, as the user walks down the −90 degree path, the algorithm should not decide that this path is parallel to the 60 degree path because the 60 degree heading doesn't reflect anything about the actual path the user is taking. If a parallel line is found, the data points corresponding to the most recent line of best fit are rotated about the beginning point of the line to be exactly parallel with the older line.

When a parallel line is found, the algorithm can also check several conditions designed to determine if the two paths are in fact the same path. The conditions are (points A and B are endpoints of the new line; points 1 and 2 are endpoints of the previous line):
1. Is point A close to point 1 and point B close to point 2?
2. Is point A close to point 2 and point B close to point 1?
3. Is the x-value of point A between the x-values of points 1 and 2?
4. Is the x-value of point B between the x-values of points 1 and 2?
5. Is the current line's new y-intercept within a certain tolerance of the previous line's y-intercept?

If any of conditions (1) to (4) are met and condition (5) is met, the two paths can be considered to be the same, and the coordinates contained in the new line can be snapped to the old line.

Compare to Previous Corners—A corner is defined as a point between two paths whose headings differ by at least 45 degrees. If the second-to-last endpoint is a corner, check if it is close to a previous corner and if the two corners have the same shape, i.e. is the heading of the path leading into corner 1 similar to the heading of the path leading into corner 2, and does the same apply for the paths coming after the corners? If so, the two corners are probably the same, and the points by the more recent corner can be shifted to match the previous corner. This is basically the same approach used to match the current path to previous paths, but because embodiments of the present invention are comparing shapes instead of just straight lines, it is less likely that the corner will get mistakenly identified as the same as another corner. That means that the tolerances used to compare the slopes and positions of two corners can be larger, which makes it possible to correct more extreme cases of drift.

Using Local Magnetic Field Aberrations as Landmarks—

As previously discussed, the magnetic field in most environments are generally uniform, with the Earth's magnetic field being the dominant signal by an order of magnitude. However, there are other sources, potentially, that present significant deviations. For example a refrigerator or television produces significant, highly localize magnetic fields that we've demonstrated can be measured using the magnetometers in the devices tested. As a result, it is possible to augment and correct drifts in position estimates by mapping these areas of magnetic aberrations and using them as "magnetic landmarks", thereby essentially drawing a magnetic topography against which to compare estimated device location. Stated another way, one embodiment of the present invention can include detecting aberrations in a magnetic field around the mobile device, augmenting the map of the path based the detected aberrations, wherein augmenting the map comprises adding one or more magnetic landmarks to the map based on the detected aberrations, and correcting a position estimate for the mobile device based on the augmented map and a currently detected aberration.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for locating and tracking a mobile device, the method comprising:
    reading sensor data from each of a plurality of sensors within the mobile device, the sensors providing the sensor data without relying on a signal from any device external to the mobile device; and
    determining motion, velocity, and heading of the mobile device through a machine learning process based on the sensor data without relying on a signal from any device external to the mobile device, wherein the machine learning process comprises:
  collecting sensor data and noise from each of the plurality of sensors over a time period,
  fusing the collected sensor data and noise to produce estimates for each of a plurality of indications related to orientation of the mobile device,
  normalizing each of the estimates,
  forming a plurality of vectors representing activity of the mobile device based on the normalized estimates,
  classifying the activity of the mobile device over the time period as motion or static based on the plurality of vectors, and
  in response to classifying activity of the mobile device as motion, determining a velocity for the mobile device based on the sensor data and determining a heading for the mobile device based on the sensor data.

2. The method of claim 1, wherein the plurality of sensors comprises a compass, a gyroscope, and an accelerometer.

3. The method of claim 1, wherein determining the velocity for the mobile device comprises:
  calculating a mean and a standard deviation for each of a plurality of sensor data readings;
  generating a feature vector based on each calculated mean and standard deviation;
  comparing the generated feature vector to a reference data set;
  assigning each feature vector to a cluster based on said comparing; and
  determining the velocity for the mobile device based on the clustered feature vector data.

4. The method of claim 1, wherein determining the heading for the mobile device comprises:
  determining a magnitude of a set of angular velocity data;
  determining whether the magnitude exceeds a pre-defined threshold; and
  in response to determining the magnitude exceeds the pre-defined threshold, considering the mobile device to be rotating, correcting the sensor data for drift over time, and recording the corrected sensor data as a heading for the mobile device.

5. The method of claim 1, further comprising mapping a path of the mobile device, wherein mapping the path comprises:
  identifying each of a plurality of axes of a plane in which the mobile device is moving;
  determining a first heading vector along the identified axes based on the sensor data;
  determining a second heading vector along the identified axes based on the sensor data;
  filtering the determined heading vectors; and
  drawing a map of the path of the mobile device on the plane based on the filtered heading vectors.

6. The method of claim 5, wherein filtering the determined heading vectors comprises:
  storing the first heading vector as a third heading vector when a difference between the first heading vector and the second heading vector is determined to be large;
  copying the third heading vector to a fourth heading vector when a heading of a previous point is consistent with a heading of a current point;
  storing the first heading vector as a fifth heading vector when there is a large consistent difference between the first heading vector and the fourth heading vector;
  discarding heading vectors that indicate quick changes; and
  filling gaps created by said discarding based on previous heading vectors and next heading vectors of the discarded heading vectors.

7. The method of claim 5, wherein drawing the map of the path of the mobile device comprises:
  finding a current line of best fit for information received;
  comparing the current line of best fit to previously saved lines;
  in response to determining the current line of best fit is close to parallel to a previously saved line, adjusting the current line of best fit to be parallel to the previously saved line;
  in response to determining the current line of best fit is close in position to a previously saved line, adjusting the position of the current line of best fit to match the position of the previously saved line;
  in response to determining the current line of best fit includes a corner and in response to determining the corner of the current line of best fit matches a corner of a previously saved line, adjusting points of the current line of best fit to match points of the previously saved line.

8. The method of claim 5, further comprising:
  detecting aberrations in a magnetic field around the mobile device;
  augmenting the map of the path based the detected aberrations, wherein augmenting the map comprises adding one or more magnetic landmarks to the map based on the detected aberrations; and
  correcting a position estimate for the mobile device based on the augmented map and a currently detected aberration.

9. A system comprising:
a processor; and
a memory coupled with and readable by the processor and having stored therein a sequence of instructions which, when executed by the processor, causes the processor to locate and track a mobile device by:
reading sensor data from each of a plurality of sensors within the mobile device, the sensors providing the sensor data without relying on a signal from any device external to the mobile device; and
determining motion, velocity, and heading of the mobile device through a machine learning process based on the sensor data without relying on a signal from any device external to the mobile device, wherein the machine learning process comprises:
  collecting sensor data and noise from each of the plurality of sensors over a time period,
  fusing the collected sensor data and noise to produce estimates for each of a plurality of indications related to orientation of the mobile device,
  normalizing each of the estimates,
  forming a plurality of vectors representing activity of the mobile device based on the normalized estimates,
  classifying the activity of the mobile device over the time period as motion or static based on the plurality of vectors, and
  in response to classifying activity of the mobile device as motion, determining a velocity for the mobile device based on the sensor data and determining a heading for the mobile device based on the sensor data.

10. The system of claim 9, wherein the plurality of sensors comprises a compass, a gyroscope, and an accelerometer.

11. The system of claim 9, wherein determining the velocity for the mobile device comprises:
- calculating a mean and a standard deviation for each of a plurality of sensor data readings;
- generating a feature vector based on each calculated mean and standard deviation;
- comparing the generated feature vector to a reference data set;
- assigning each feature vector to a cluster based on said comparing; and
- determining the velocity for the mobile device based on the clustered feature vector data.

12. The system of claim 9, wherein determining the heading for the mobile device comprises:
- determining a magnitude of a set of angular velocity data;
- determining whether the magnitude exceeds a pre-defined threshold; and
- in response to determining the magnitude exceeds the pre-defined threshold, considering the mobile device to be rotating, correcting the sensor data for drift over time, and recording the corrected sensor data as a heading for the mobile device.

13. The system of claim 9, further comprising mapping a path of the mobile device, wherein mapping the path comprises:
- identifying each of a plurality of axes of a plane in which the mobile device is moving;
- determining a first heading vector along the identified axes based on the sensor data;
- determining a second heading vector along the identified axes based on the sensor data;
- filtering the determined heading vectors; and
- drawing a map of the path of the mobile device on the plane based on the filtered heading vectors.

14. The system of claim 13, wherein filtering the determined heading vectors comprises:
- storing the first heading vector as a third heading vector when a difference between the first heading vector and the second heading vector is determined to be large;
- copying the third heading vector to a fourth heading vector when a heading of a previous point is consistent with a heading of a current point;
- storing the first heading vector as a fifth heading vector when there is a large consistent difference between the first heading vector and the fourth heading vector;
- discarding heading vectors that indicate quick changes; and
- filling gaps created by said discarding based on previous heading vectors and next heading vectors of the discarded heading vectors.

15. The system of claim 13, wherein drawing the map of the path of the mobile device comprises:
- finding a current line of best fit for information received;
- comparing the current line of best fit to previously saved lines;
- in response to determining the current line of best fit is close to parallel to a previously saved line, adjusting the current line of best fit to be parallel to the previously saved line;
- in response to determining the current line of best fit is close in position to a previously saved line, adjusting the position of the current line of best fit to match the position of the previously saved line;
- in response to determining the current line of best fit includes a corner and in response to determining the corner of the current line of best fit matches a corner of a previously saved line, adjusting points of the current line of best fit to match points of the previously saved line.

16. The system of claim 13, further comprising:
- detecting aberrations in a magnetic field around the mobile device;
- augmenting the map of the path based the detected aberrations, wherein augmenting the map comprises adding one or more magnetic landmarks to the map based on the detected aberrations; and
- correcting a position estimate for the mobile device based on the augmented map and a currently detected aberration.

17. A computer-readable memory having stored thereon a sequence of instructions which, when executed by a processor, causes the processor to locate and track a mobile device by:
- reading sensor data from each of a plurality of sensors within the mobile device, the sensors providing the sensor data without relying on a signal from any device external to the mobile device; and
- determining motion, velocity, and heading of the mobile device through a machine learning process based on the sensor data without relying on a signal from any device external to the mobile device, wherein the machine learning process comprises:
  - collecting sensor data and noise from each of the plurality of sensors over a time period,
  - fusing the collected sensor data and noise to produce estimates for each of a plurality of indications related to orientation of the mobile device,
  - normalizing each of the estimates,
  - forming a plurality of vectors representing activity of the mobile device based on the normalized estimates,
  - classifying the activity of the mobile device over the time period as motion or static based on the plurality of vectors, and
  - in response to classifying activity of the mobile device as motion, determining a velocity for the mobile device based on the sensor data and determining a heading for the mobile device based on the sensor data.

18. The computer-readable memory of claim 17, wherein the plurality of sensors comprises a compass, a gyroscope, and an accelerometer.

19. The computer-readable memory of claim 17, wherein determining the velocity for the mobile device comprises:
- calculating a mean and a standard deviation for each of a plurality of sensor data readings;
- generating a feature vector based on each calculated mean and standard deviation;
- comparing the generated feature vector to a reference data set;
- assigning each feature vector to a cluster based on said comparing; and
- determining the velocity for the mobile device based on the clustered feature vector data.

20. The computer-readable memory of claim 17, wherein determining the heading for the mobile device comprises:
- determining a magnitude of a set of angular velocity data;
- determining whether the magnitude exceeds a pre-defined threshold; and
- in response to determining the magnitude exceeds the pre-defined threshold, considering the mobile device to be rotating, correcting the sensor data for drift over time, and recording the corrected sensor data as a heading for the mobile device.

21. The computer-readable memory of claim 17, further comprising mapping a path of the mobile device, wherein mapping the path comprises:
 identifying each of a plurality of axes of a plane in which the mobile device is moving;
 determining a first heading vector along the identified axes based on the sensor data;
 determining a second heading vector along the identified axes based on the sensor data;
 filtering the determined heading vectors; and
 drawing a map of the path of the mobile device on the plane based on the filtered heading vectors.

22. The computer-readable memory of claim 21, wherein filtering the determined heading vectors comprises:
 storing the first heading vector as a third heading vector when a difference between the first heading vector and the second heading vector is determined to be large;
 copying the third heading vector to a fourth heading vector when a heading of a previous point is consistent with a heading of a current point;
 storing the first heading vector as a fifth heading vector when there is a large consistent difference between the first heading vector and the fourth heading vector;
 discarding heading vectors that indicate quick changes; and
 filling gaps created by said discarding based on previous heading vectors and next heading vectors of the discarded heading vectors.

23. The computer-readable memory of claim 21, wherein drawing the map of the path of the mobile device comprises:
 finding a current line of best fit for information received;
 comparing the current line of best fit to previously saved lines;
 in response to determining the current line of best fit is close to parallel to a previously saved line, adjusting the current line of best fit to be parallel to the previously saved line;
 in response to determining the current line of best fit is close in position to a previously saved line, adjusting the position of the current line of best fit to match the position of the previously saved line;
 in response to determining the current line of best fit includes a corner and in response to determining the corner of the current line of best fit matches a corner of a previously saved line, adjusting points of the current line of best fit to match points of the previously saved line.

24. The computer-readable memory of claim 21, further comprising:
 detecting aberrations in a magnetic field around the mobile device;
 augmenting the map of the path based the detected aberrations, wherein augmenting the map comprises adding one or more magnetic landmarks to the map based on the detected aberrations; and
 correcting a position estimate for the mobile device based on the augmented map and a currently detected aberration.

* * * * *